(12) United States Patent　(10) Patent No.: US 6,506,061 B2
Yuasa et al.　(45) Date of Patent: Jan. 14, 2003

(54) ELECTRICAL CONNECTION BOX TO BE MOUNTED ON A VEHICLE

(75) Inventors: Eriko Yuasa, Yokkaichi (JP); Shuji Yamakawa, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 09/944,225

(22) Filed: Sep. 4, 2001

(65) Prior Publication Data

US 2002/0053476 A1　May 9, 2002

(30) Foreign Application Priority Data

Sep. 7, 2000　(JP) ......................................... 2000-271534

(51) Int. Cl.$^7$ ............................................. H01R 12/00
(52) U.S. Cl. ..................................... 439/76.2; 174/72 B
(58) Field of Search ................................ 439/76.2, 949; 174/72 B, 71 B, 70 B, 88 B

(56) References Cited

U.S. PATENT DOCUMENTS

| | | | | |
|---|---|---|---|---|
| 4,871,884 A | * | 10/1989 | Hayashi | 174/52.1 |
| 4,952,753 A | * | 8/1990 | Hayashi et al. | 174/52.1 |
| 4,963,099 A | * | 10/1990 | Sato et al. | 439/205 |
| 5,362,242 A | * | 11/1994 | Nakamura | 439/76.2 |
| 5,823,819 A | * | 10/1998 | Kondo et al. | 439/487 |
| 5,831,814 A | * | 11/1998 | Hamill | 174/52.1 |
| 5,967,819 A | * | 10/1999 | Okada | 439/212 |
| 6,008,982 A | * | 12/1999 | Smith | 174/52.1 |
| 6,428,331 B1 | * | 8/2002 | Yamakawa et al. | 439/205 |

FOREIGN PATENT DOCUMENTS

JP　2000-59951　2/2000

* cited by examiner

*Primary Examiner*—Tulsidas Patel
(74) *Attorney, Agent, or Firm*—Oliff & Berridge, PLC

(57) ABSTRACT

An electrical connection box for a vehicle is to be mounted in an engine compartment and connected to a voltage source of the vehicle having a nominal maximum voltage of not less than 14V. The box has a casing having a rear wall which in use is mounted against an upstanding wall of the vehicle, a front wall and side walls and a bottom wall sloping downwardly. The bottom wall has a water drainage hole at its lowermost portion adjacent said rear wall. Electrical circuit insulation plates are mounted with main faces parallel to the rear wall and bus bars are mounted on said main faces. Electrical relay receiving elements, electrical fuse receiving elements and electrical connector receiving elements are located on at least one of the front and side walls. The arrangement reduces risk of problems due to water ingress.

6 Claims, 4 Drawing Sheets

ELECTRICAL CONNECTION BOX TO BE MOUNTED ON A VEHICLE

BACKGROUND OF THE INVENTION

1. Field of Invention

The present invention relates to an electrical connection box which in use is mounted on a vehicle, such as an automobile, and is adapted to be connected to an electrical power source of the vehicle, particularly a high voltage power source. The invention further relates to a vehicle having such an electrical connection box mounted thereon.

2. Description of Related Art

Normally one secondary, i.e. rechargeable, battery having a rated voltage of 12V and a maximum nominal voltage of 14V is mounted on an automobile of the internal combustion engine type. A voltage up to the maximum voltage of 14V is applied from the battery to a circuit composed of bus bars and the like that are accommodated in an electrical connection box. The power supply is distributed by the internal circuit of the electrical connection box. The operation of electric/electronic component parts mounted on the vehicle is controlled through electric wires connected with the internal circuit.

On a goods vehicle, such as a lorry or truck, a rated voltage of 24V and a maximum voltage of 28V are applied to a circuit by a battery structure.

In recent years, electric/electronic component parts have been mounted in increasing numbers on a vehicle, and there is an increase in the electric current which is applied to one electric/electronic component part. For example, the electric power required to drive a fan is conventionally 130 watts, but has become 260 watts in recent years. At the rated voltage of 12V of the battery, it is impossible to operate suction and exhaust devices of an engine, electromotive power steering, and the like devices, requiring a high voltage such as 36V. Therefore, they are mechanically operated by the driving force of the engine.

With the increase of the electric current applied to each electric/electronic component part, the diameter of the electric wires used has become larger. Further, with rapid increase of the number of electric/electronic component parts, the number of electric wires has increased recently, which has increased the diameter of a wire harness having a bundle of electric wires. Consequently, the weight of the electric wires to be wired on a vehicle body has increased.

As described above, if the power supply from the battery is incapable of operating the suction and exhaust devices of the engine, they are mechanically operated. In this case, it is impossible to accomplish fine control of the operation of the suction and exhaust devices. Further, much fuel is consumed, which pollutes the environment. Accordingly, it is preferable to operate the suction and exhaust devices of the engine and the like not mechanically but electrically by the power supply from the battery.

In the case where the circuit is so constructed that a voltage higher than 14V can be applied to the circuit of the electrical connection box composed of bus bars and the like, it is possible to reduce the required electric current and thus the diameter of the electric wires and the size of a bundle of a plurality of electric wires (wire harness). Therefore, it is possible to reduce the weight of the electric wires.

Further, with the application of a high voltage to the circuit composed of bus bars and the like, it is possible to control the operation of the suction and exhaust devices, the power steering motor, and the like not mechanically or hydraulically but electrically. In this case, it is possible to accomplish fine control of the operation of suction and exhaust devices and the like. Further, fuel consumption can be reduced, which reduces pollution.

It is preferable to apply a high voltage of about 42V to the electromotive power steering motor, the suction and exhaust devices of the engine, the fan, and/or other devices requiring a high voltage. On the other hand, in an automobile, it is preferable to apply the rated voltage of 12V (maximum voltage: 14V) to signal-generating devices of the electric/electrical component parts and coils of relays.

In the case where the electrical connection box, with a circuit to which a high voltage of about 42V is applied, is mounted in the engine compartment of the vehicle, drops of water are liable to penetrate into the electrical connection box through gaps at a relay receiving element, a connector receiving element or a fuse receiving element, thus penetrating into gaps between high-voltage bus bars and causing a risk of leak currents.

It is known in electrical connection boxes to provide a stack of insulation plates carrying bus bars. Japanese Laid-Open Patent Application No. 2000-059951 shows a stack in which insulation boards and bus bars are vertical.

SUMMARY OF THE INVENTION

It is an object of the present invention to minimize risk that drops of water penetrating into an electrical connection box generate leak currents between the high-voltage bus bars, in the case where the electrical connection box mounted on a vehicle body is provided with a circuit to which a high voltage is applied.

According to the present invention, there is provided an electrical connection box for a vehicle adapted to be mounted in an engine compartment of the vehicle and to be connected to a voltage source of the vehicle having a nominal maximum voltage of not less than about 14V and not more than about 200V. The electrical connection box has a casing having a rear wall which in use is mounted against an upstanding wall of the vehicle, a front wall spaced from the rear wall, a pair of side walls extending between the front and rear walls and a bottom wall sloping downwardly in the direction from the front wall to the rear wall, the bottom wall having at least one water drainage hole at its lowermost portion adjacent the rear wall, and a plurality of electrical circuit insulation plates mounted in the casing having main faces parallel to the rear wall, and a plurality of bus bars mounted on the main faces. The casing has electrical relay receiving elements, electrical fuse receiving elements and electrical connector receiving elements located on at least one of its front and side walls.

In a second aspect, the invention provides a vehicle having an engine compartment having an upstanding wall surface, a voltage source having a nominal maximum output voltage of not less than 14V and not more than 200V, and an electrical connection box mounted in the engine compartment. The electrical connection box has a casing having a rear wall located on the upstanding wall surface of the engine compartment, a front wall spaced from the rear wall, a pair of side walls extending between the front and rear walls and a bottom wall sloping downwardly in the direction from the front wall to the rear wall, the bottom wall having at least one water drainage hole at its lowermost portion adjacent the rear wall, and a plurality of electrical circuit insulation plates mounted in the casing having main faces parallel to the rear wall, and a plurality of bus bars mounted on the main faces. The casing has electrical relay receiving elements, electrical fuse receiving elements and electrical connector receiving elements located on at least one of its front and side walls. Electrical relays are mounted on the electrical relay receiving elements, electrical fuses are mounted on the electrical fuse receiving elements, and electrical connectors are mounted on the electrical connector receiving elements. At least one, preferably a plurality, of the bus bars are electrically connected to the voltage source.

The upstanding wall surface of the vehicle on which the rear wall of the electrical connection box is mounted is most preferably vertical, but may be inclined at not more than 45°, more preferably not more than 30° to the vertical. Most preferably, therefore, the bus bars in the box are vertical.

The voltage applied to the bus bars is indicated as not less than 14V. In practice, for reasons given above, the high voltage in a vehicle, such as an automobile, to which the invention is applied, is more than about 14V, i.e. is about 28V or more, particularly about 42V or more.

As described above, because the bus bars are disposed upright, water which has penetrated into the gaps between the bus bars can be drained away easily. Thus it is possible to prevent a leak current from being generated between the bus bars. Further because relays, fuses and connectors are mounted on the vertical outer wall surfaces of the electrical connection box, open faces of cavities or sockets accommodating them extend vertically. Thus it is possible to prevent drops of water from penetrating into the electrical connection box via gaps at such cavities.

The bottom wall of the electrical connection box is inclined downwardly toward the surface of the vehicle body on which the electrical connection box is installed, and the drainage hole is formed at the lowermost position of the bottom wall. Thus drops of water that penetrate into the electrical connection box are discharged from the drainage hole. Discharged drops of water run by gravity along the vehicle body. Therefore, it is possible to prevent the drops of water from splashing on other component parts in the vehicle body.

Furthermore, when the electrical connection box is in contact with the vehicle body, heat generated by the high voltage is released by transmitting the heat to the vehicle body.

It is preferable that the high voltage to be applied to the high-voltage bus bar is about 42V. In this case, it is easy to provide the voltage applied to the high-voltage bus bar at about 42V by connecting in series three batteries each having a rated voltage of 12V (nominal maximum voltage: 14V) generally used in automobiles. Needless to say, it is possible to use a single battery having a maximum voltage of about 42V. The reason why the high voltage to be applied to the high-voltage bus bar is set to 42V is partly because using a voltage close to or above 50V for the high-voltage bus bar may be dangerous. The present inventors have conducted salt water experiments in order to ascertain the degree of risk when applying a voltage of 42V in an electrical junction box suitable for use in an automobile engine compartment. The experiments were done as follows:

1 ml of salt water was injected into each terminal hole of the casing of a junction box which had bus bars disposed inside. Electrical components such as relay, fuse, connectors, etc. were mounted on the casing. A voltage of 42V was applied to bus bars of the junction box for 8 hours and then suspended for 16 hours. This was repeated twice. There was initially no change to the bus bars and electrical components. After the third repetition, it was found that extra electric current passed between the bus bars generating heat, and a portion of bus bars was melted. The heat also melted resin around bus bars such as an insulation plate, casing and resin portion of electrical components adjacent the casing.

Accordingly, since damage did not occur until after the third exposure to salt water, it was confirmed that in consideration of conditions under normal use of an automobile, the application of the electric power at 42V to the electric/electronic component parts should not cause a problem.

BRIEF DESCRIPTION OF THE DRAWINGS

An embodiment of the present invention will be described below by way of non-limitative example with reference to drawings, in which.

DETAILED DESCRIPTION OF PREFERRED EMBODIMENTS

Figure 1:
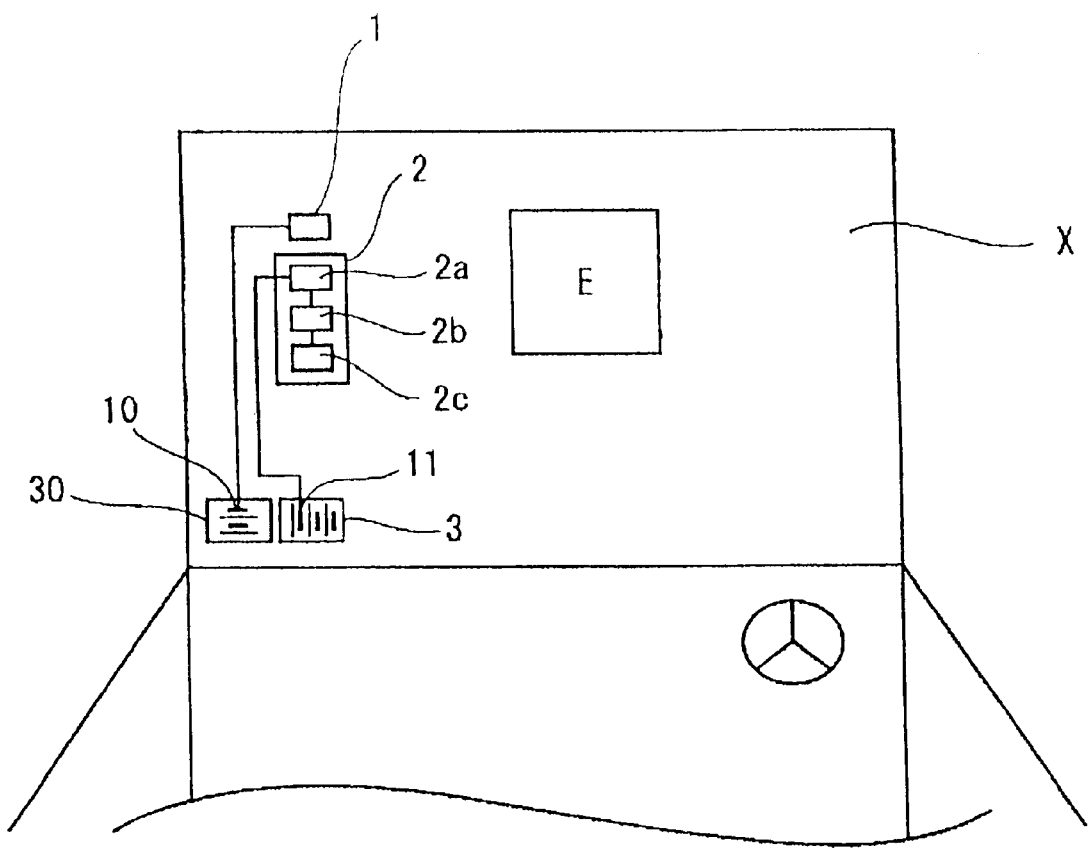
FIG. 1 is a diagrammatic view showing a first embodiment of the present invention.

As schematically shown in FIG. 1, in an automobile to which the present invention is applied, an engine E is mounted in an engine compartment X to drive the vehicle and generate electrical power through a conventional device such as an alternator (not shown). A low-voltage battery structure 1 and a high-voltage battery structure 2 are mounted in the engine compartment X. The low-voltage battery structure 1 includes a general-purpose battery of conventional type having a rated voltage 12V and a nominal maximum voltage of 14V. The high-voltage battery structure 2 includes three batteries 2a, 2b, and 2c connected in series to generate a nominal maximum voltage of 42V. Each of the three batteries 2a, 2b, and 2c has a rated voltage of 12V, and may be of the type conventionally used in vehicles. Needless to say, it is possible to use a single battery having a maximum voltage of 42V.

The high-voltage battery structure 2 is connected to high-voltage bus bars 11 accommodated in an electrical connection box 3 mounted in the engine compartment X to apply a high voltage (nominal maximum voltage: 42V) to the high-voltage bus bars 11. On the other hand, the low-voltage battery structure 1 is connected to low-voltage bus bars 10 accommodated in a second electrical connection box 30 to apply a low voltage (nominal maximum voltage: 14V) to the low-voltage bus bars 10. The first and second electrical connection boxes 3 and 30 provide distribution of electrical power to the various electrical and electronic devices of the vehicle.

Figure 2:
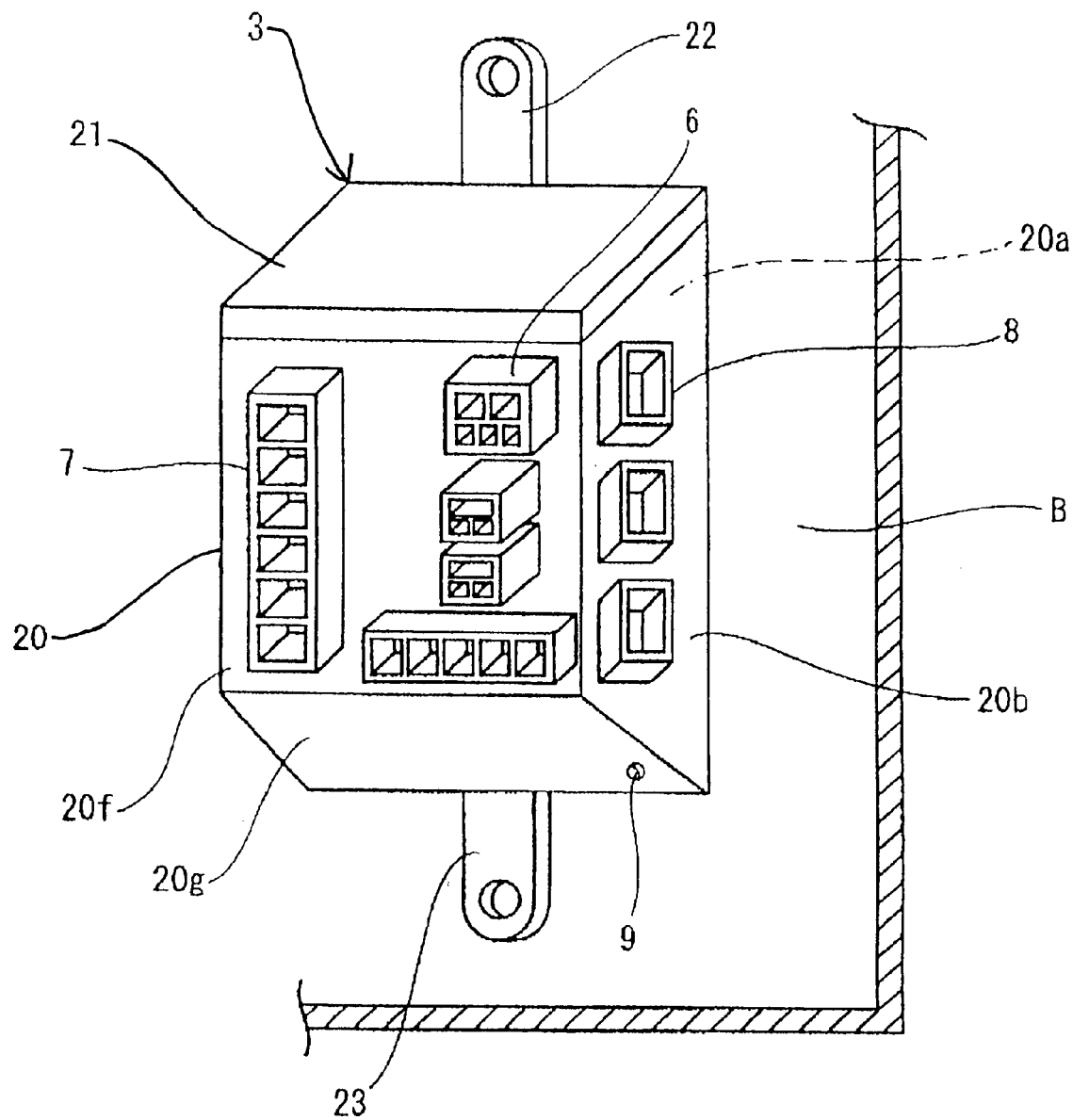
FIG. 2 is a schematic perspective view showing the electrical connection box of the first embodiment.
Figure 3:
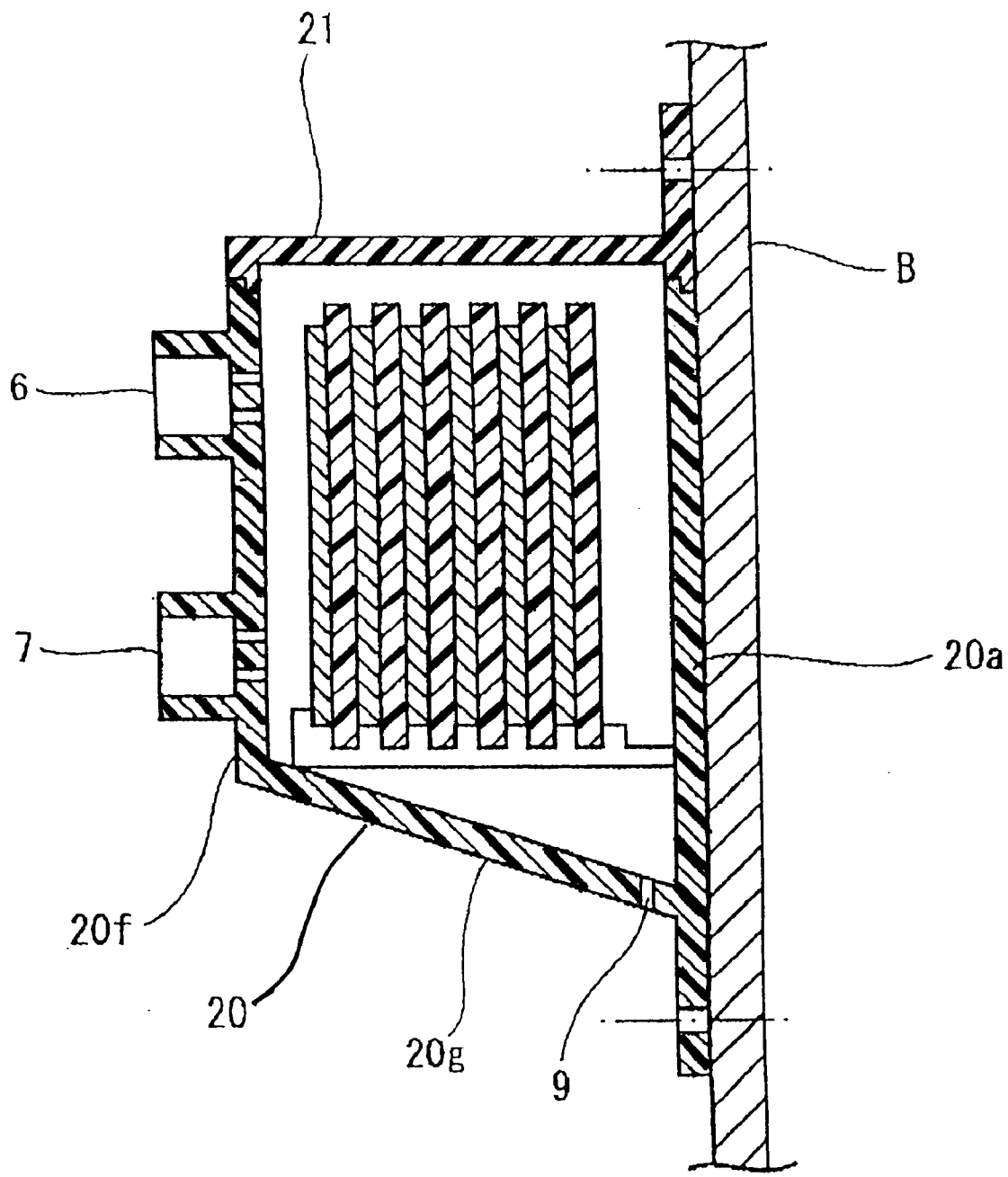
FIG. 3 is a vertical sectional view of the connection box of FIG. 2.
Figure 4:
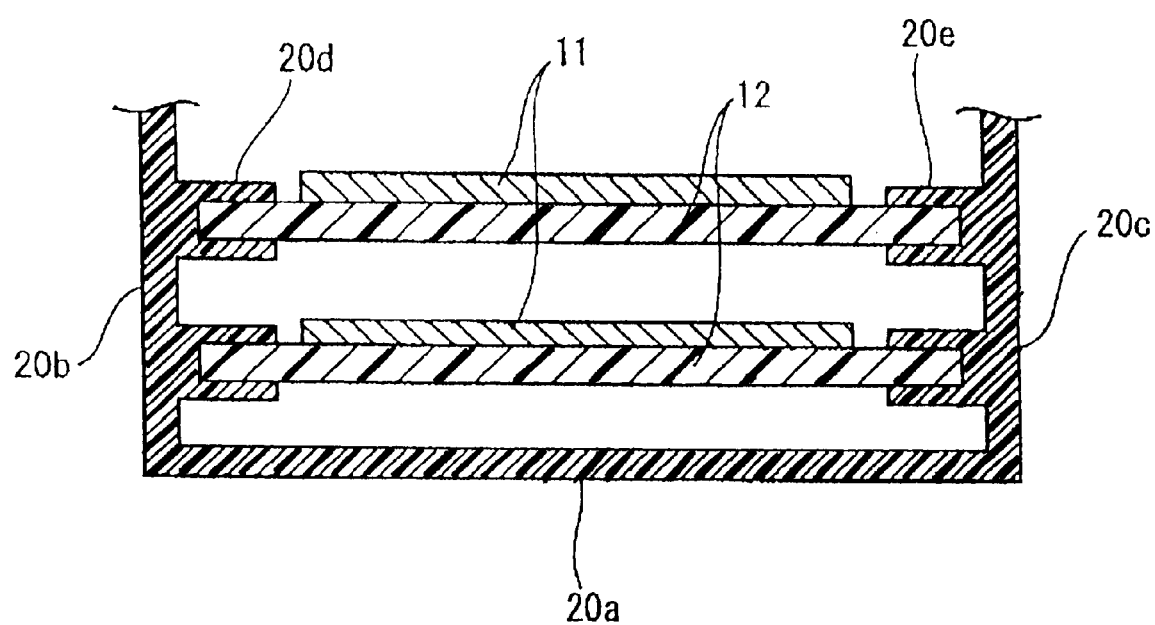
FIG. 4 is a partial horizontal sectional view of the connection box of FIG. 2.

As shown in FIGS. 2 to 4, the first electrical connection box 3 has a housing including a vertically extending lower case 20 whose bottom surface is closed and whose upper end is open and an upper case 21 closing the open upper end of the lower case 20. The lower case 20 accommodates the high-voltage bus bars 11 and insulation plates 12 which are disposed vertically and alternatingly with each other. The upper case 21 and the lower case 20 are detachably locked to each other, by locking devices (not shown). The upper and lower cases 20 and 21 are plastics moldings.

A vertically extending rear wall 20a of the lower case 20 is mounted on a vertical wall B of the vehicle body, with the wall 20a in contact with the vehicle body. Opposed paired supports 20d and 20e project inward from the inner surface of left and right side walls 20b and 20c, respectively, perpendicularly to the rear surface 20a. (See FIG. 4). The electrical connection box 3 accommodates the vertical high-voltage bus bars 11 and insulation plates 12 with the supports 20d and 20e providing slots and supporting both sides of the insulation plates 12 on which the high-voltage bus bars 11 are mounted.

A front wall 20f of the electrical connection box 3 opposite the rear wall 20a is provided with sockets 6 for receiving relays and sockets 7 for receiving fuses. The relays and fuses are in use connected to the high-voltage bus bars 11, e.g. by terminals and tabs. Each of the left and right side walls 20b and 20c is provided with sockets 8 for receiving connectors by which the high-voltage bus bars 11 and external electric wires to each other, to connect to the battery structure 2 and the electrical and electronic components of the vehicle.

In this embodiment, the upper case 21 is not provided with such sockets, but is formed as a complete closed surface.

The closed bottom wall 20g of the lower case 20 may incline downward from the front wall 20f to the rear wall 20a. A drainage hole 9 is preferably formed at the lowermost position of the bottom wall 20g.

Because the electrical connection box 3 is disposed in the engine compartment, it is liable to be exposed to water, but due to its arrangement described above, water which has penetrated into the box is discharged to the outside via the hole 9.

Brackets 22 and 23 projecting from the upper case 21 and the lower case 20 respectively are fixed to the vehicle body wall B, e.g. by bolts, screws or the like.

The electrical connection box 30 accommodating the low-voltage bus bars 10 may have a construction similar to that of a conventional connection box. That is, the low-voltage bus bars 10 and the insulation plates may be alternately disposed, with the low-voltage bus bars 10 and the insulation plates being horizontal. Alternatively, in addition to the high-voltage bus bars 11, the low-voltage bus bars 10 may be also accommodated vertically in the electrical connection box 3. In this illustrated embodiment, the electrical connection box 30 accommodating the low-voltage bus bars 10 and the electrical connection box 3 accommodating the high-voltage bus bars 11 are disposed in the engine compartment X, with the electrical connection boxes 30 and 3 adjacent to each other. Necessary circuit connections are accomplished through external electric wires.

The electrical connection box 30 accommodating the low-voltage bus bars 10 may alternatively be disposed in the passenger compartment, similarly to a conventional junction box.

As described above, the high-voltage bus bars 11 are disposed vertically in the electrical connection box 3. As FIG. 4 indicates, the insulation boards carrying the bus bars may be spaced apart, so that there are gaps between them. Even if water penetrates into the box 3 and attaches to the high-voltage bus bars 11, drops of water which have become attached flow downward by gravity. Thus, it is possible to prevent the high-voltage bus bars from accumulating water and thus avoid leak currents being generated.

Water which has collected at the bottom wall of the electrical connection box 3 and dropped from the drainage hole 9 and drops of water which have attached to the outer surface of the lower case 20 of the electrical connection box 3 can flow away along the body wall B. Consequently, it is possible to prevent such water from splashing on other component parts disposed below the electrical connection box 3.

Because the relay and fuse sockets 6 and 7 are disposed on the vertical surfaces of the electrical connection box 3, it is possible to prevent water from penetrating into the electrical connection box 3. The mounting area of the sockets 6 and 7 is relatively large.

Further, because the connector sockets 8 are disposed on the vertical side surfaces 20b and 20c, tabs of the high-voltage bus bars 11 can project in the same direction as the direction in which the high-voltage bus bars 11 extend. Therefore, it is not necessary to bend the high-voltage bus bars 11 to form the tabs, but only necessary to project the tabs from the ends of the high-voltage bus bars 11. Therefore, it is easy to form the high-voltage bus bars 11.

The above-described embodiment is applied to an automobile on which a battery structure of the rated voltage of 12V is mounted. However, in the case where a nominal maximum voltage of 28V is applied to bus bars of an electrical connection box of an automobile or a truck, the electrical connection box having the above-described construction may accommodate both low-voltage bus bars to which the voltage of 28V is applied and high-voltage bus bars to which a voltage of 42V is applied.

A maximum voltage of 42V is applied to the high-voltage bus bar 11 in the above-described embodiment. However, needless to say, a high voltage in the range of 42V to 200V can be applied to the high-voltage bus bar 11, provided that safety is ensured.

As apparent from the foregoing description, by the present invention, when a high voltage is applied to the bus bar accommodated in the electrical connection box, permitting reduction of the diameter of electric wires and the size of a wire harness used in the vehicle by reducing the amount of electric current, it is possible to avoid problems caused by water which is liable to penetrate into the electrical connection box disposed in the engine compartment. The high-voltage bus bars and the insulation plates are disposed vertically. Thus the water which has penetrated into the electrical connection box can be drained away conveniently. Consequently, it is possible to minimize the risk of generation of a leak current.

Further, it is possible to prevent drops of water from penetrating into the electrical connection box through relay sockets, fuse sockets and connector sockets by installing the relays, fuses, and connectors on vertical walls of the electrical connection box and installing the rear wall thereof on the vehicle body wall.

The bottom wall of the electrical connection box is inclined downward toward the vehicle body wall, and the drainage hole or holes are disposed at the lowermost position of the bottom wall of the electrical connection box. Thus drops of water discharged from the electrical connection box and those which have attached to the outer surface of the electrical connection box flow away along the vehicle body, by gravity. Therefore, it is possible to prevent drops of water from splashing on other component parts.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. An electrical connection box for a vehicle adapted to be mounted in an engine compartment of the vehicle and to be connected to a voltage source of the vehicle having a nominal maximum voltage of not less than about 14V and not more than about 200V, said electrical connection box comprising:

a casing having a rear wall which in use is mounted against an upstanding wall of the vehicle, a front wall spaced from said rear wall, a pair of side walls extending between said front and rear walls, and a bottom wall sloping downwardly in the direction from said front wall to said rear wall, said bottom wall having at least one water drainage hole at its lowermost portion adjacent said rear wall; and a plurality of electrical circuit insulation plates mounted in said casing having main faces parallel to said rear wall, and a plurality of bus bars mounted on said main faces, wherein said casing has one or more electrical relay receiving elements, one or more electrical fuse receiving elements and one or more electrical connector receiving elements located on at least one of said front and side walls.

2. An electrical connection box according to claim 1, wherein said electrical relay receiving elements and said electrical fuse receiving elements are located on said front wall of said casing, and said electrical connector receiving elements are located on at least one of said side walls thereof.

3. An electrical connection box according to claim 1, wherein said nominal maximum voltage is about 42V.

4. A vehicle comprising:

an engine compartment having an upstanding wall surface;

a voltage source having a nominal maximum output voltage of not less than about 14V and not more than about 200V;

an electrical connection box mounted in said engine compartment and comprising:

a casing having a rear wall located on said upstanding wall surface of said engine compartment, a front wall spaced from said rear wall, a pair of side walls extending between said front and rear walls and a bottom wall sloping downwardly in the direction from said front wall to said rear wall, said bottom wall having at least one water drainage hole at its lowermost portion adjacent said rear wall; and a plurality of electrical circuit insulation plates mounted in said casing having main faces parallel to said rear wall, and a plurality of bus bars mounted on said main faces, wherein said casing has one or more electrical relay receiving elements, one or more electrical fuse receiving elements and one or more electrical connector receiving elements located on at least one of said front and side walls;

a plurality of electrical relays received in said electrical relay receiving elements;

a plurality of electrical fuses received in said electrical fuse receiving elements; and a plurality of electrical connectors received in said electrical connector receiving elements;

wherein at least one of said bus bars is electrically connected to said voltage source.

5. A vehicle according to claim 4, wherein said electrical relay receiving elements and said electrical fuse receiving elements are located on said front wall of said casing, and said electrical connector receiving elements are located on at least one of said side walls thereof.

6. A vehicle according to claim 4, wherein said nominal maximum voltage is about 42V.

* * * * *